May 3, 1960 J. MOE 2,934,850
CASTING WEIGHTS FOR FISHING LINES
Filed Sept. 3, 1958
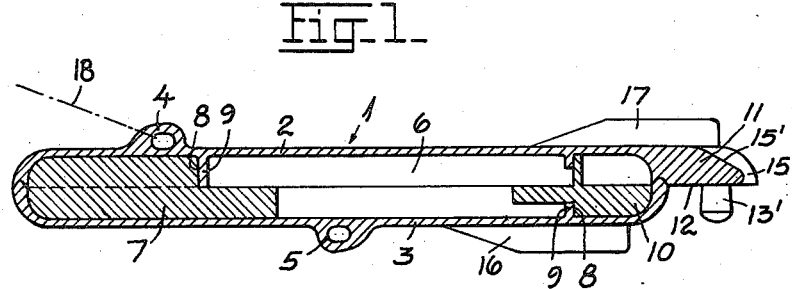
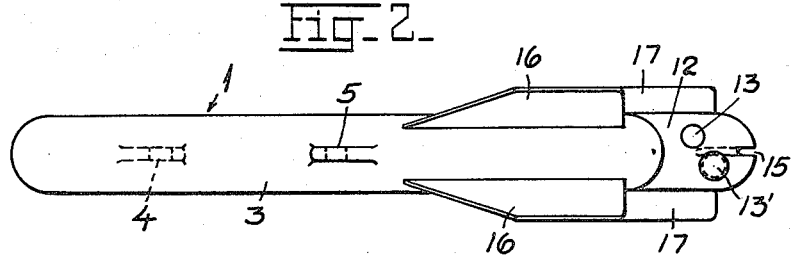
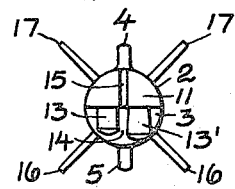
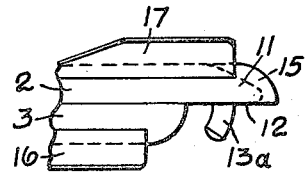
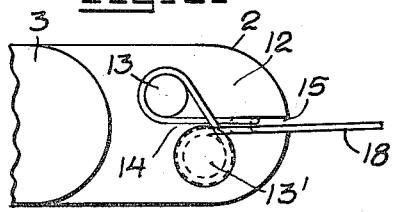
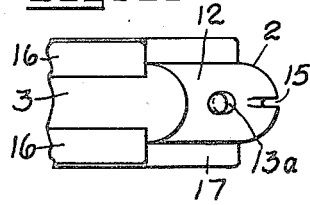
INVENTOR
JAMES MOE
By Kurt Kelman
HIS AGENT United States Patent Office 2,934,850
Patented May 3, 1960

2,934,850

CASTING WEIGHTS FOR FISHING LINES

James Moe, Oslo, Norway

Application September 3, 1958, Serial No. 758,764

Claims priority, application Norway March 20, 1958

6 Claims. (Cl. 43—43.11)

The present invention relates to a casting weight for use on a fishing line when the weight of lures attached thereto is insufficient to obtain the desired casting length.

An object of the present invention is to provide a casting weight which renders possible long casts and which insures an ideal conveyance through the water during retraction, so that the lures also are conveyed in the most effective manner.

The invention resides in the provision of a casting weight comprising an elongated body having its center of gravity in front of the center thereof, which body is provided at its higher gravity front end with a first fastening means to which a fishing line is permanently attached, and at its lower gravity rear end with a second fastening means to which the fishing line may be releasably attached for casting of the weight with the front end leading, the arrangement being such that when the tension in the line caused by the cast ceases, the line due to the elasticity thereof automatically releases itself from the second fastening means so that the weight is reversed and retracted with the front end leading.

Other objects and advantages of the invention will be apparent from the following description when taken in connection with the accompanying drawing in which Figure 1 is a central vertical sectional view showing a preferred embodiment of the casting weight according to the invention, Figure 2 shows the weight from below, Figure 3 is an end elevation of the weight as seen from the right hand end of Fig. 1, Figure 4 is a side view showing a modification of the rear portion of the weight, Figure 5 shows the embodiment of Fig. 4 from below, and Figure 6 is a fragmentary view illustrating the manner in which the fishing line is releasably attached to the fastening means at the rear end of the casting weight.

In the drawing 1 indicates the casting weight which may have the shape of a substantially cylindrical hollow body having a rounded front end. The body, which preferably is made of a suitable plastic material such as nylon, may be formed in two halves, an upper half 2 and a lower half 3, secured to one another by welding, glueing or in another suitable manner, the dividing plane substantially coinciding with the horizontal axial plane through the body. Adjacent to its front end, the body is provided on its upper side with a line receiving eye 4 and a similar eye 5 is arranged on the lower side of the body, approximately at the center thereof, for attachment of a leader. Rings or loops (not shown) may be mounted in the eyes 4 and 5 in a manner known per se.

In the cavity 6 of the body 1, a weight 7 having a suitable gravity is positioned at the front end thereof. The weight may be made of metal, preferably lead. The weight 7 has a cross section corresponding to that of the cavity 6 and, in order to prevent axial displacements of the weight relative to the body the weight 7 is provided with a shoulder 8 engaging a cross rib 9 formed integrally with the upper half 2. Fine regulation of the weight 7 may take place by varying the length of that portion thereof which projects beyond the shoulder 8.

A balancing weight 10 is inserted into the rear end of the cavity 6 in such a way that when the body 1, suspended from a line attached to the eye 4, is immersed in water the weight 10 opposes the force of buoyancy of the rear end of the body 1, whereby the latter assumes a substantially horizontal position. The weight 10 may be held against axial movements by means of co-operating ribs 9 and shoulders 8 in the same manner as the weight 7.

At the rear end of the body 1, the upper half 2 is extended somewhat beyond the lower half 3, and the so formed extension 11 has a plane lower surface 12 coinciding with the division plane between the halves 2 and 3. On the surface 12 are arranged two pins 13 and 13′ projecting substantially at right angles therefrom and positioned one at each side of the longitudinal vertical plane through the body to form a space 14 therebetween. The pin 13 may be placed in staggered relation to the pin 13′ in the direction toward the front end of the body. The pin 13 is of cylindrical shape while the pin 13′ preferably has a slight conical shape with its greater-diameter end distant from the surface 12.

The rear end of the extension 11 is formed with a central vertical groove 15 the bottom surface 15′ of which is inclined upwardly and forwardly and merges into the upper side of the half 2 as is best shown in Fig. 1. In order to guide the run of the casting weight through the air as well as through the water, the body of the weight is provided with steering wings 16 and 17 of which the upper wings 17 are positioned nearer to the rear end of the body than the lower wings 16.

When the casting weight above described is drawn through the water by means of a line 18 attached to the eye 4, the weight descends to a depth determined by its gravity and the rate of the pull. Due to the effect of the balancing weight 10 the buoyancy of the rear end of the body is opposed so that the body is forced to occupy a substantially horizontal position. The steering wings 16 and 17 also assist the body 1 to maintain such position.

The arrangement of the present invention renders it possible to cast the weight with the heavy front end leading.

This is attained in that the line 18, which is permanently attached to the eye 4, is passed rearwardly along the upper side of the body, down through the groove 15, thereupon forwardly between the pins 13 and 13′, about the outer side of the pin 13 and thereafter through the space 14 and about the pin 13′ and backwards between the pins 13 and 13′ as illustrated in Fig. 6. The portion of the line 18 extending rearwardly from the body 1 coincides substantially with the axis of the casting weight and at the same time maintains these parts of the line which are wound on the pins 13, 13′ against the surface 12. Owing to such arrangement, the weight is suspended on the line 18 with the heavy front end extending downwardly and the line 18 is held on the pins by the force of gravity so that the weight may be thrown out in such position by dragging the line along.

However, at the end of the path of the weight the tension or pull in the line decreases and, due to the inherent flexibility of the line, its convolutions passing about the pins 13 and 13′ are automatically released while the line still remains between the steering wings 16.

When the weight 1 has touched the water and pull is exerted in the line 18 in order to retract the weight, the latter is first reversed because the pull is transferred to the eye 4 at the front end of the body, so that the front end is again in front during retraction of the weight as above described.

A modified embodiment of the invention is illustrated in Figs. 4 and 5, according to which the fastening means at the rear end of the weight comprises a single pin 13a projecting from the surface 12 substantially at the center thereof. The pin 13a is bent slightly in forward direction.

In this embodiment the line 18, passing through and extending from the groove 15, is led about the pin 13a to form one or more turns and thereafter rearwardly as described above.

The casting weight according to the present invention is formed with a view to permit automatic release of relatively thin and pliable monofilament fishing lines made of a suitable plastic material from the pin or pins as previously described. As will be readily understood, lines of any suitable material, mono- or polyfilament, may be used, it being only necessary that the lines possess the requisite flexibility.

A casting weight according to the invention may be caused to run as desired even in stream, which has not been possible with prior types of casting weights, and it therefore is well adapted for use as a so-called controller during fishing salmon and sea-trout in greater and comparatively deep rivers.

The casting weight may be provided with a fish hook, such as a treble-hook, attached to the eye 5, and may then be used as casting tinbait. Moreover, the weight may assume the shape of a fish, and is then adapted for hooking.

The body 1 may be made of any suitable material, such as plastic or the like, and may be of any desired color. The weight may also be manufactured in different sizes and may thus be of varying gravity.

I claim:

1. A fishing line casting weight comprising an elongated hollow body having a front end and a rear end and consisting of an upper half and a lower half secured to one another along a horizontal longitudinal plane, a first eye formed at the upper side of said upper half adjacent the front end thereof, a second eye formed at the underside of said lower half approximately at the center thereof, an extension at the rear end of said upper half having a lower surface coinciding with said horizontal plane, said extension being formed with a vertical guide groove at the rear end thereof and having an upwardly and forwardly extending bottom surface in said groove, at least one pin-like fastening member projecting from said lower surface, a sinking weight in the front end of said hollow body, a balancing weight in the rear end of said hollow body, and means for holding said weights against axial movements in said body.

2. A fishing line casting weight as set forth in claim 1, comprising a single pin-like fastening member projecting from the center of said lower surface, said fastening member being bent toward the front end of said body.

3. A fishing line casting weight as set forth in claim 1, comprising a pair of pin-like fastening members located at the opposing sides of a central vertical plane passing through said body and staggered with respect to one another.

4. A fishing line casting weight as set forth in claim 1, further comprising radial steering wings connected to the rear portions of said upper and lower halves.

5. A fishing line casting weight comprising an elongated body having a front end and a rear end, and having its center of gravity closer to said front end, said body consisting of an upper half and a lower half, the upper half having an extension projecting rearwardly beyond said lower half and the extension having a lower surface coinciding with a central horizontal plane passing through said body, the extension being formed with a vertical guide groove and having an upwardly and forwardly extending bottom surface in said grove, an eye at the upper side and adjacent the front end of said upper half, a fishing line permanently attached to said eye, and fastening means comprising two pin-like members projecting downwardly from the lower surface of said extension and located at the opposing sides of a central vertical plane passing through said body, said line extending through said groove and being wound about said pin-like members so as to be releasably attached to the rear end of said body during casting of the weight with the latter's front end leading, and said line automatically unwinding itself from said pin-like members when the tension therein caused by the cast ceases, whereby the traction is transferred to said eye to reverse the weight and to permit retraction thereof with said front end leading.

6. A fishing line casting weight as set forth in claim 3, wherein one of said pin-like members is cylindrical and the other pin-like member is conical, said conical member having a larger-diameter end remote from the lower surface of said extension, said members being positioned in staggered relation with respect to one another.

References Cited in the file of this patent

UNITED STATES PATENTS

| | | |
|---|---|---|
| 1,918,507 | Westling | July 18, 1933 |
| 1,960,488 | Gray | May 29, 1934 |
| 2,256,173 | Schechterle | Sept. 16, 1941 |
| 2,573,981 | Nelson | Nov. 6, 1951 |
| 2,601,736 | Fisher | July 1, 1952 |
| 2,687,592 | Purcell | Aug. 31, 1954 |

FOREIGN PATENTS

| | | |
|---|---|---|
| 399,701 | Great Britain | Oct. 12, 1933 |